United States Patent [19]

Miyoshi et al.

[11] 4,404,342
[45] Sep. 13, 1983

[54] PROCESS FOR PREPARING A COPOLYMER

[75] Inventors: Mituji Miyoshi, Kanagawa; Kazuo Matsuura, Kawasaki; Yoshio Tajima, Tokyo, all of Japan

[73] Assignee: Nippon Oil Company, Ltd., Tokyo, Japan

[21] Appl. No.: 297,959

[22] Filed: Aug. 31, 1981

Related U.S. Application Data

[63] Continuation of Ser. No. 122,985, Feb. 20, 1980, abandoned.

[30] Foreign Application Priority Data

Feb. 27, 1979 [JP] Japan ................................. 54-21445

[51] Int. Cl.$^3$ ...................... C08F 4/02; C08F 210/02
[52] U.S. Cl. ..................................... 526/125; 526/124; 526/141; 526/142; 526/151; 526/348.2; 526/348.3; 526/348.6; 526/906
[58] Field of Search ............... 526/124, 125, 151, 141, 526/142

[56] References Cited

U.S. PATENT DOCUMENTS

| | | | |
|---|---|---|---|
| 3,959,409 | 5/1976 | Fren et al. ........................... | 526/158 |
| 4,076,924 | 2/1978 | Toyota et al. ...................... | 526/125 |
| 4,085,276 | 4/1978 | Toyota et al. ...................... | 526/125 |
| 4,107,415 | 8/1978 | Giannini et al. ................... | 526/125 |
| 4,115,319 | 9/1978 | Scata et al. ........................ | 526/125 |
| 4,143,223 | 3/1979 | Toyota et al. ...................... | 526/125 |
| 4,146,502 | 3/1979 | Yokoyama et al. ................. | 526/125 |
| 4,157,435 | 6/1979 | Toyota et al. ...................... | 526/125 |
| 4,168,361 | 9/1979 | Oda et al. ............................ | 526/125 |
| 4,180,636 | 12/1979 | Hirota et al. ....................... | 526/125 |
| 4,199,473 | 4/1980 | Timms ................................. | 526/151 |
| 4,221,894 | 9/1980 | Ushida et al. ...................... | 526/125 |
| 4,294,948 | 10/1981 | Toyota et al. ...................... | 526/125 |
| 4,304,890 | 12/1981 | Suzuki et al. ...................... | 526/348.6 |

*Primary Examiner*—Edward J. Smith
*Attorney, Agent, or Firm*—Wyatt, Gerber, Shoup, Scobey & Badie

[57] ABSTRACT

According to this invention, there is provided a process for preparing a low-crystalline soft or semi-hard copolymer, characterized in that 90 to 98 mole % of propylene, 0.2 to 9 mole % of ethylene and 0.2 to 9 mole % of a straight-chained α-olefin having not less than four carbon atoms are copolymerized using a catalyst, said catalyst comprising (1) a solid substance containing magnesium and titanium, (2) an organometallic compound and (3) an electron donor.

13 Claims, No Drawings

PROCESS FOR PREPARING A COPOLYMER

This is a continuation of application Ser. No. 122,985 filed Feb. 20, 1980 now abandoned.

BACKGROUND OF THE INVENTION

1. Field of the Invention

This invention relates to a process for preparing a low-crystalline soft or semi-hard copolymer of high transparency by copolymerizing ethylene, propylene and a straight-chained α-olefin having not less than four carbon atoms.

2. Description of the Prior Art

As a soft or semi-hard resin, polyvinyl chloride has heretofore been known, and in recent years copolymers consisting primarily of ethylene have also come to be known. As to a soft or semi-hard copolymer consisting primarily of propylene, however, various proposals have been made but have not been put to practical use yet.

Recently there has been proposed a process for preparing a soft or semi-hard copolymer by random copolymerization of propylene and butene-1 (see Japanese Patent Public Disclosure No. 79984/78). This process, however, involves a problem undesirable in point of production cost such that the expensive butene-1 must be used in a large amount.

As to a process for preparing a terpolymer of ethylene, propylene and an α-olefin having not less than four carbon atoms, there are known processes, for example, those disclosed in Japanese Patent Public Disclosures Nos. 79195/76 and 26883/78. All these processes, however, employ a catalyst comprising the combination of a TiCl$_3$-containing component and an organoaluminum compound to prepare a crystalline terpolymer. They are disadvantageous in that a soft or semi-hard copolymer is not obtainable.

SUMMARY OF THE INVENTION

Having made extensive studies to obtain a low-crystalline soft or semi-hard polymer of high transparency, we accomplished this invention.

That is, this invention provides a process for preparing a low-crystalline soft or semi-hard copolymer of high transparency by copolymerizing 90 to 98 mole% of propylene, 0.2 to 9 mole% of ethylene and 0.2 to 9 mole% of a straight-chained α-olefin having not less than four carbon atoms in the presence of a catalyst, which catalyst comprises (1) a solid substance containing magnesium and titanium, (2) an organometallic compound and (3) an electron donor.

Terpolymers prepared according to the process of this invention have much superior characteristics to those of bipolymers. Besides, the production of terpolymers according to this invention requires only a very small amount of the expensive starting α-olefin as compared with the production of bipolymers, and thus is economical.

DESCRIPTION OF THE INVENTION

The catalyst used in the in the invention comprises the combination of (1) a solid substance containing magnesium and titanium, (2) an organometallic compound and (3) an electron donor. Examples of such solid substance are those obtained by attaching, in known manner, a titanium compound to inorganic solid carriers such as metallic magnesium, magnesium hydroxide, magnesium carbonate, magnesium oxide and magnesium chloride; also double salt, double oxide, carbonate, chloride and hydroxide which contain a metal selected from silicon, aluminum and calcium, and magnesium atom; and further these inorganic solid carriers treated or reacted with an oxygen-containing compound, a sulfur-containing compound, a hydrocarbon or a halogen-containing substance.

Examples of such oxygen-containing compound are alcohols, aldehydes, ketones, ethers, carboxylic acids, and derivatives thereof. As the sulfur-containing compound, thiophene and thiol are preferred. As the hydrocarbon, aromatic hydrocarbons are preferred, such as durene, anthracene and naphthalene. And as the halogen-containing substance, halogenated hydrocarbons are preferred, such as 1,2-dichloroethane, n-butyl chloride, t-butyl chloride, and p-chlorobenzene.

Examples of other solid substances which may be suitably used in this invention are reaction products of organomagnesium compounds, e.g. so-called Grignard compounds, and titanium compounds. As organomagnesium compounds there may be used, for example, those represented by the general formulae RMgX, R$_2$Mg, and RMg(OR) wherein R is an organic radical having 1 to 20 carbon atoms and X is halogen, and ether complexes thereof, and also these organomagnesium compounds after modification with various other organometallic compounds, e.g. organosodium, organolithium, organopotassium, organoboron, organocalcium and organozinc.

By way of illustrating titanium compounds which may be used in the invention, mention may be made of halides, alkoxyhalides, alkoxides, oxides and halogenated oxides of tetravalent titanium or trivalent titanium. Preferable tetravalent titanium compounds are the compounds represented by the general formula Ti(OR)$_n$X$_{4-n}$ wherein R is an alkyl, alkenyl, aryl and aralkyl group having 1 to 20 carbon atoms, preferably 1 to 8 carbon atoms, X is halogen and n is a whole number of from 0 to 4. Examples of the tetravalent titanium compounds are titanium tetrachloride, titanium tetrabromide, titanium tetraiodide, methoxytitanium trichloride, methoxytitanium tribromide, dimethoxytitanium dichloride, dimethoxytitanium dibromide, trimethoxytitanium chloride, titanium tetramethoxide, ethoxytitanium trichloride, ethoxytitanium tribromide, diethoxytitanium dichloride, diethoxytitanium dibromide, triethoxytitanium chloride, titanium tetraethoxide, isopropoxytitanium trichloride, isopropoxytitanium tribromide, diisopropoxytitanium dichloride, triisopropoxytitanium chloride, titanium tetraisoporpoxide, t-butoxytitanium trichloride, di-t-butoxytitanium dichloride, tri-t-butoxytitanium chloride, titanium tetra-t-butoxide, n-pentoxytitanium trichloride, di-n-pentoxytitanium dichloride, n-hexoxytitanium trichloride, phenoxytitanium trichloride, diphenoxytitanium dichloride, triphenoxytitanium chloride, titanium tetraphenoxide, reaction product of SiCl$_4$ and the compound Ti(OR)$_n$X$_{4-n}$ and mixtures thereof.

Trivalent titanium compounds employed in the present invention are not specially restricted. Among these may be mentioned titanium trihalides obtained by reducing titanium tetrahalides with hydrogen, aluminum, titanium or an organometallic compound of a metal of the groups I to III of the Periodic Table. Preferable titanium trihalides are TiCl$_3$, TiCl$_3$.$\frac{1}{3}$AlCl$_3$ and TiBr$_3$. Trivalent titanium compounds except titanium trihalides may be obtained by reducing various tetravalent titanium alkoxyhalides represented by the general formula $Ti(OR)_mX_{4-m}$ wherein R is an alkyl, alkenyl, aryl or aralkyl group having 1 to 20 carbon atoms, X is halogen and m is a whole number of from 1 to 4, with an organometallic compound of a metal of the group I to III of the Periodic Table, at a temperature of from $-80°$ C. to 200° C., preferable 0° C. to 100° C. and molar ratio of titanium alkoxyhalide to organometallic compound being in the range of from 1:5 to 5:1, preferably 1:2 to 2:1.

Of these titanium compounds, tetravalent titanium compounds are specially preferred.

To illustrate such solid substance, mention may be made of the following as typical examples (in the following formulae R represents an organic radical and X represents halogen): $MgO-RX-TiCl_4$ system (see Japanese Patent Publication No. 3514/76), $Mg-SiCl_4-ROH-TiCl_4$ system (see Japanese Patent Publication No. 23864/75), $MgCl_2-Al(OR)_3-TiCl_4$ system (see Japanese Patent Publications Nos. 152/76 and 15111/77), $MgCl_2$-aromatic hydrocarbon-$TiCl_4$ system (see Japanese Patent Publication No. 48915/77), $MgCl_2-SiCl_4-ROH-TiCl_4$ system (see Japanese Patent Public Disclosure No. 106581/74), $Mg(OOCR)_2-Al(OR)_3-TiCl_4$ system (see Japanese Patent Publication No. 11710/77), $MgCl_2-RX-TiCl_4$ system (see Japanese Patent Public Disclosure No. 42584/77), $Mg-POCl_3-TiCl_4$ system (see Japanese Patent Publication No. 153/76), $MgCl_2-AlOCl-TiCl_4$ system (see Japanese Patent Public Disclosure No. 133386/76), $RMgX-TiCl_4$ system (see Japanese Patent Publication No. 39470/75),

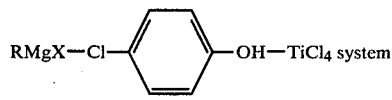

(see Japanese Patent Public Disclosure No. 119977/74), and

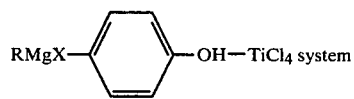

(see Japanese Patent Public Disclosure No. 119982/74).

As organometallic compounds used in the invention there may be employed those of Group I–IV metals of the Periodic Table, which are known as one component of a Ziegler catalyst. Above all, organoaluminum compounds and organozinc compounds are preferred. Examples are organoaluminum compounds represented by the general formulae $R_3Al$, $R_2AlX$, $RAlX_2$, $R_2AlOR$, $RAl(OR)X$ and $R_3Al_2X_3$ wherein R, which may be same or different, is an alkyl or aryl groups of $C_1$ to $C_{20}$ and X is halogen, and organozinc compounds represented by the general formula $R_2Zn$ wherein R, which may be same or different, is an alkyl group of $C_1$ to $C_{20}$, such as triethylaluminum, triisobutylaluminum, trihexylaluminum, trioctylaluminum, diethylaluminum chloride, ethylaluminum sesquichloride, diethylzinc, and mixtures thereof.

In this invention the amount of an organometallic compound to be used is not specially limited, but usually may range from 0.1 to 1000 moles per mole of a titanium compound.

As the electron donor used in this invention there may be employed alcohols, ethers, ketones, aldehydes, organic acids, organic acid esters, acid halides, acid amides, amines, and nitriles.

Examples of alcohols are those of $C_1$ to $C_{18}$ such as methyl alcohol, ethyl alcohol, n-propyl alcohol, isopropyl alcohol, allyl alcohol, n-butyl alcohol, isobutyl alcohol, sec-butyl alcohol, t-butyl alcohol, n-amyl alcohol, n-hexyl alcohol, cyclohexyl alcohol, decyl alcohol, lauryl alcohol, myristyl alcohol, cetyl alcohol, stearyl alcohol, oleyl alcohol, benzyl alcohol, naphthyl alcohol, phenol, and cresol.

Examples of ethers are those of $C_2$ to $C_{20}$ such as dimethyl ether, diethyl ether, dibutyl ether, isoamyl ether, anisole, phenetole, diphenyl ether, phenylallyl ether, and benzofuran.

Examples of ketones are those of $C_3$ to $C_{18}$ such as acetone, methyl ethyl ketone, methyl isobutyl ketone, methyl phenyl ketone, ethyl phenyl ketone, and diphenyl ketone.

Examples of aldehydes are those of $C_2$ to $C_{15}$ such as acetaldehyde, propionaldehyde, octylaldehyde, benzaldehyde, and naphthaldehyde.

Examples of organic acids are those of $C_1$ to $C_{24}$ such as formic acid, acetic acid, propionic acid, butyric acid, valeric acid, pivalic acid, caproic acid, caprylic acid, stearic acid, oxalic acid, malonic acid, succinic acid, adipic acid, methacrylic acid, benzoic acid, toluic acid, anisic acid, oleic acid, linoleic acid, and linolenic acid.

Examples of organic acid esters are those of $C_2$ to $C_{30}$ such as methyl formate, methyl acetate, ethyl acetate, propyl acetate, octyl acetate, ethyl propionate, methyl butyrate, ethyl valerate, methyl methacrylate, methyl benzoate, ethyl benzoate, propyl benzoate, octyl benzoate, phenyl benzoate, benzyl benzoate, ethyl o-methoxybenzoate, ethyl p-methoxybenzoate, butyl p-ethoxybenzoate, methyl p-toluylate, ethyl p-toluylate, ethyl p-ethylbenzoate, methyl salicylate, phenyl salicylate, methyl naphthoate, ethyl naphthoate, and ethyl anisate.

Examples of acid halides are those of $C_2$ to $C_{15}$ such as acetyl chloride, benzyl chloride, toluic acid chloride, and anisic acid chlorides.

Examples of acid amides are acetic amide, benzoic acid amide, and toluic acid amide.

Examples of amines are methylamine, ethylamine, diethylamine, tributylamine, piperidine, tribenzylamine, aniline, pyridine, picoline, and tetramethylenediamine.

Examples of nitriles are acetonitrile, benzonitrile, and tolunitrile.

Among these electron donors, which may be used alone or in combination of two or more, organic acid esters or ethers are specially preferred.

In the catalyst used in the invention comprising (1) a solid substance containing magnesium and titanium, (2) an organometallic compound and (3) an electron donor, the whole or a part of the electron donor (3) may be fixed to the solid substance (1) or may be an addition product with the organometallic compound (2); or the whole of the electron donor, or the remainder of the electron donor except the portion fixed to the solid substance (1), and/or the remainder of the electron donor except the portion used as the addition product with the organometallic compound (2), may be added into the polymerization system.

Typical methods of fixing an electron donor to the solid substance (1) are as follows.

(i) Copulverizing a magnesium-containing substance, a titanium compound and an electron donor simultaneously.

(ii) Adding a titanium compound to the reaction product of a magnesium-containing substance and an electron donor, followed by copulverization.

(iii) Adding a magnesium-containing substance to the reaction product of an electron donor and a titanium compound, followed by copulverization.

(iv) Copulverizing a magnesium-containing substance and an electron donor, then contacting a titanium compound in liquid or vapor phase with the copulverized matter.

(v) Further contacting a titanium compound in liquid phase with the product obtained in any of the above (i)–(iii).

The apparatus to be used for such copulverization is not specially limited, but usually employed are ball mill, vibration mill, rod mill, and impact mill. Pulverization conditions such as pulverization temperature and time can be decided easily by those skilled in the art according to the pulverization method adopted. Generally, the pulverization temperature may range from 0° to 50° C. and the pulverization time from 0.5 to 50 hours, preferably from 1 to 30 hours.

In the foregoing method (iv) or (v), in the case of contacting a titanium compound in liquid phase, there may be contacted a liquid titanium as it is or in an inert solvent such as hexane or heptane at a reaction temperature of 0° to 150° C., then the solid component is separated and washed with an inert solvent to give a solid component to be used in the invention.

The amount of a titanium compound to be used in the invention is preferably adjusted so that the titanium content of the resulting solid component is in the range of from 0.5 to 10% by weight. The range of 1 to 8% by weight is specially preferred in order to attain well-balanced activity per titanium and that per solid.

In the case of using an electron donor as an addition product with the organometallic compound (2), it is preferable that the molar ratio of electron donor to organometallic compound be in the range of from 1:2 to 2:1.

In any mode of use of electron donor, it is desirable in this invention that the total amount of electron donor present in the catalyst system be 0.05 mole or more, preferably from 0.05 to 10 mole and most preferably from 0.2 to 10 mole, based on the amount of magnesium (gram-atom) in the catalyst system.

This invention is to copolymerize, using the foregoing catalyst, 90–98 mole% propylene with 2–10 mole% of ethylene and a straight-chained α-olefin of $C_4$ or more, whereby there is obtained a low-crystalline soft or semi-hard copolymer of high transparency. In this case, the composition ratio of the mixture of ethylene and straight-chained α-olefin of $C_4$ or more is ethylene 10–90 mole% and the said α-olefin 10–90 mole%.

Copolymers prepared according to this invention exhibit good properties, for example, they have a melting point based on DSC of 50° to 140° C., a Haze value, after pressing into 0.5 mm thickness at 190° C., of not larger than 40% measured by the method defined in JIS K 6714, and a Shore C hardness (JIS) of usually 30 to 98. Copolymers obtained according to this invention usually contain 5 to 20 wt.% of boiling n-heptane insoluble matters, but in this invention it is not necessary at all to remove them. That is, copolymers prepared according to this invention, even if the boiling n-heptane insoluble portion is not removed, exhibit superior properties, e.g. high transparency. As previously noted, moreover, copolymers obtained according to this invention have various characteristics, that is, have a good processability and are especially superior in transparency, blocking resistance, heat-sealing property and flexibility, and so are suitable for molding into various products, including films, sheets and hollow containers. Furthermore, by blending with various thermoplastic resins, such as high-, medium- and low-density polyethylenes, polypropylene, polybutene, poly-4-methylpentene-1, and polystyrene, copolymers prepared according to this invention can improve strength, impact resistance, transparency and low-temperature characteristics, and thus can also be used as a resin modifier.

In case the composition ratio of ethylene, propylene and a straight-chained α-olefin of $C_4$ or more is outside the range specified herein, it is impossible to obtain such superior copolymers as in this invention.

By way of illustrating straight-chained α-olefins having not less than four carbon atoms which may be used in this invention, mention may be made of straight-chained α-olefins having 4 to 18 carbons atoms such as butene-1, pentene-1, hexene-1, heptene-1, octene-1, nonene-1, and dodecene-1. Also, these olefins may be used as mixtures.

The copolymerization reaction using the catalyst of this invention is carried out in the same manner as in the conventional olefin polymerization reaction using a Ziegler catalyst. That is, the reaction is performed in a substantially oxygen- and water-free condition and in vapor phase, or in the presence of an inert solvent or with monomer itself as solvent. The polymerization conditions involve temperatures ranging from 20° to 300° C., preferably from 40° to 180° C., and pressures ranging from atmospheric pressure to 70 kg/cm$^2$·G, preferably from 2 to 60 kg/cm$^2$·G. The molecular weight can be adjusted to some extent by changing the polymerization conditions such as polymerization temperature and the molar ratio of catalyst, but the addition of hydrogen into the polymerization system is more effective for this purpose. Of course, two or more stage polymerization reactions involving different polymerization conditions such as different hydrogen concentrations and different polymerization temperatures can be done without any trouble using the catalyst of this invention.

DESCRIPTION OF PREFERRED EMBODIMENTS

Working examples of this invention are given below, but it is to be understood that these examples are for illustration only to work the invention and are not intended to limit the invention.

EXAMPLE 1

(1) Catalyst Preparations 10 g. of anhydrous magnesium chloride and 0.5 ml. of 1,2-dichloroethane were placed in a stainless steel pot having a content volume of 400 ml. and containing 25 stainless steel balls each ½ inch in diameter, and a ball milling was done for 16 hours at room temperature in a nitrogen atmosphere. Then after adding 1.8 g of titanium tetrachloride, ball milling was again performed for 16 hours at room temperature in a nitrogen atmosphere. The resulting solid powder contained 39 mg. of titanium per gram thereof.

(2) Polymerization 20 g. of dried polyethylene powder, a suspention containing 120 mg. of the above solid powder in 12 ml. of n-hexane, 2 mmol of triethylaluminum and 0.7 mmol of ethyl benzoate were placed in a 2 liter stainless steel autoclave with an induction stirrer adjusted to 50° C. Hexane was distilled off with stirring under reduced pressure, then a mixed gas of 90 mole% propylene, 5 mole% 1-butene and 5 mole% ethylene was introduced until the total pressure was 5 kg/cm$^2$·G, under which condition polymerization was started. The polymerization was continued for 2 hours while the mixed gas was introduced continuously to maintain the total pressure at 5 kg/cm$^2$·G. As a result, there was obtained 105 g. of a newly produced copolymer with the polyethylene powder initially fed to the autoclave subtracted.

The catalyst activity was 21,875 g.polymer/g.Ti, and the copolymer thus prepared had the following physical properties.

| Shore C hardness (JIS) | 80 |
|---|---|
| Haze (0.5 mm sheet) | 18% |
| Boiling n-heptane insoluble portion | 11 wt. % |

COMPARATIVE EXAMPLE 1

Polymerization was carried out in the same manner as in Example 1 except that the composition of the mixed gas was changed into 95 mole% propylene and 5 mole% 1-butene, to yield 101 g. of copolymer. Physical properties of this copolymer are shown in Table 1.

COMPARATIVE EXAMPLE 2

Polymerization was carried out in the same manner as in Example 1 except that the composition of the mixed gas was changed into 95 mole% propylene and 5 mole% ethylene, to yield 103 g. of copolymer. Physical properties of this copolymer are also shown in Table 1.

COMPARATIVE EXAMPLE 3

Polymerization was carried out in the same manner as in Example 1 except that the composition of the mixed gas was changed into 90 mole% propylene and 10 mole% 1-butene, to yield 99 g. of copolymer. Physical properties of this copolymer are also shown in Table 1.

TABLE 1

|  | Comparative Example 1 | Comparative Example 2 | Comparative Example 3 |
|---|---|---|---|
| Haze (0.5 mm sheet), % | 53.6 | 51.6 | 40.1 |
| Boiling n-heptane insoluble portion, wt. % | 60.3 | 57.8 | 31.7 |

As is apparent from Table 1, the copolymers obtained in Comparative Examples 1 through 3, as compared with the copolymer obtained in Example 1, contain larger portions insoluble in boiling n-heptane and are much inferior in transparency.

EXAMPLE 2

Polymerization was carried out in the same manner as in Example 1 except that the composition of the mixed gas was changed into 98 mole% propylene, 1 mole% 1-butene and 1 mole% ethylene, to yield 115 g. of copolymer.

The catalyst activity was 23,960 g.polymer/g.Ti, and the copolymer thus prepared had the following physical properties.

| Shore C hardness (JIS) | 90 |
|---|---|
| Haze (0.5 mm sheet) | 26% |
| Boiling n-heptane insoluble portion | 15 wt. % |

EXAMPLE 3

Polymerization was carried out in the same manner as in Example 1 except that the composition of the mixed gas was changed into 90 mole% propylene, 5 mole% "Dialen" (α-olefin of C$_6$ to C$_{10}$, a product of Mitsubishi Kasei Co.) and 5 mole% ethylene, to yield 85 g. of copolymer.

The catalyst activity was 17,710 g.polymer/g.Ti, and the copolymer thus prepared had the following physical properties.

| Shore C hardness (JIS) | 82 |
|---|---|
| Haze (0.5 mm sheet) | 30% |
| Boiling n-heptane insoluble portion | 13 wt. % |

EXAMPLE 4

Polymerization was carried out in the same manner as in Example 1 except that isoamyl ether was used in place of ethyl benzoate, to yield 98 g. of copolymer.

The catalyst activity was 20,420 g.polymer/g.Ti, and the copolymer thus prepared had the following physical properties.

| Shore C hardness (JIS) | 73 |
|---|---|
| Haze (0.5 mm sheet) | 15% |
| Boiling n-heptane insoluble portion | 10 wt. % |

COMPARATIVE EXAMPLE 4

Polymerization was carried out in the same manner as in Example 1 except that the composition of the mixed gas was changed into 60 mole% propylene, 35 mole% 1-butene and 5 mole% ethylene. As a result, the state of dispersion or stirring in the polymerization reaction system became bad with fouling occurred at the wall of the polymerization vessel, and the heat transfer velocity was lowered, so the polymerization was compelled to be stopped halfway.

EXAMPLE 5

A 2 liter stainless steel autoclave with an induction stirrer was purged with nitrogen, in which was then placed 500 ml. of hexane. Further added were 2 mmol of triethylaluminum, 0.7 mmol of ethyl benzoate and 120 mg. of the solid powder obtained in Example 1, and the temperature was raised to 50° C. with stirring. The system, which was pressurized to 0.5 kg/cm$^2$·G due to the vapor pressure of hexane, was further pressurized with a mixed gas of 90 mole% propylene, 5 mole% 1-butene and 5 mole% ethylene until the total pressure was 5 kg/cm$^2$·G, under which condition polymerization was started. The polymerization was continued for 2 hours while the mixed gas was introduced continuously to maintain the total pressure at 5 kg/cm$^2$·G, to yield 150 g. of copolymer.

The catalyst activity was 31,250 g.polymer/g.Ti, and the copolymer thus prepared had the following physical properties.

| Melting point | 119° C. |
|---|---|
| Shore C hardness (JIS) | 76 |
| Haze (0.5 mm sheet) | 20% |
| Boiling n-heptane insoluble portion | 12 wt. % |

EXAMPLE 6

Polymerization was carried out in the same manner as in Example 5 except that the composition of the mixed gas was changed into 95 mole% propylene, 3 mole% 1-butene and 2 mole% ethylene, to yield 145 g. of copolymer.

The catalyst activity was 30,210 g.polymer/g.Ti, and the copolymer thus prepared had the following physical properties.

| Melting point | 128° C. |
|---|---|
| Shore C hardness (JIS) | 84 |
| Haze (0.5 mm sheet) | 24% |
| Boiling n-heptane insoluble portion | 13 wt. % |

EXAMPLE 7

0.1 ml. of ethyl benzoate and 0.14 ml. of triethylaluminum were dissolved beforehand in 50 ml. of n-hexane, into which was then added 120 mg. of the solid powder obtained in Example 1 to form a suspension. The suspension was charged in a nitrogen atmosphere into a 2 liter stainless steel autoclave with an induction stirrer containing 500 ml of n-hexane, and further added was 1 mmol of diethylaluminum chloride dissolved in 10 ml. of n-hexane, and the temperature was raised to 70° C. with stirring. The system, which was pressurized to 1.0 kg/cm$^2$.G due to the vapor pressure of hexane, was further pressurized with a mixed gas of 90 mole% propylene, 5 mole% 1-butene and 5 mole% ethylene until the total pressure was 5 kg/cm$^2$.G. The polymerization was continued for 2 hours while the mixed gas was introduced continuously to maintain the total pressure at 5 kg/cm$^2$.G, to yield 135 g. of copolymer.

The catalyst activity was 28,130 g.polymer/g.Ti, and the copolymer thus prepared had the following physical properties.

| Melting point | 122° C. |
|---|---|
| Shore C hardness (JIS) | 80 |
| Haze (0.5 mm sheet) | 22% |
| Boiling n-heptane insoluble portion | 14 wt. % |

We claim:

1. A process for preparing a low crystalline soft or semi-hard copolymer having a haze value of up to 30%, characterized in that 90 to 98 mole% of propylene, 0.2 to 5 mole% of ethylene and 0.2 to 5 mole% of a straight-chained α-olefin having from four to eighteen carbon atoms are copolymerized using a catalyst at a temperature in the range of from 20° to 300° C. and at a pressure in the range of from atmospheric pressure to 70 Kg/Cm$^2$.G, said catalyst comprising (1) a solid substance containing magnesium and titanium (2) an organometallic compound of Group I–IV of the Periodic Table and (3) at least 0.05 mole based on the amount of magnesium (gram atom) of an electron donor selected from the group consisting of ethers, ketones, organic acid esters, acid halides, and nitriles.

2. A process according to claim 1, in which said solid substance consists of a titanium compound attached to an inorganic solid carrier, said inorganic solid carrier being metallic magnesium, magnesium hydroxide, magnesium carbonate, magnesium oxide, magnesium chloride, or a double salt, double oxide, carbonate, chloride or hydroxide containing a metal selected from silicon, aluminum and calcium, and magnesium atom.

3. A process according to claim 2, in which said inorganic solid carrier is treated or reacted with an oxygen-containing compound, a sulfur-containing compound, a hydrocarbon or a halogen-containing substance before attachment thereto the titanium compound.

4. A process according to claim 3, in which said oxygen-containing compound is alcohol, aldehyde, ketone, ether, carboxylic acid, or a derivative thereof, said sulfur-containing compound is thiophene or thiol, said hydrocarbon is an aromatic hydrocarbon and said halogen-containing substance is a halogenated hydrocarbon.

5. A process according to claim 1, in which said solid substance is the reaction product of an organomagnesium compound and a titanium compound.

6. A process according to claim 1, in which said organometallic compound is an organoaluminum compound or an organozinc compound.

7. A process according to claim 1, in which said organometallic compound is used in an amount of 0.1 to 1000 moles per mole of the titanium compound.

8. A process according to claim 1, in which the whole or a part of said electron donor is fixed to said solid substance (1).

9. A process according to claim 1, in which the whole or a part of said electron donor forms an addition product with said organometallic compound (2).

10. A process according to claim 1, in which the remainder of the electron donor except the portion fixed to the solid substance (1) and/or the remainder of the electron donor except the portion used as the addition product with the organometallic compound (2) are (is) added into the polymerization system.

11. A process according to claim 1, in which the total amount of the electron donor present in the catalyst system is from 0.05 to 10 moles based on the amount of magnesium (gram-atom).

12. A process according to claim 1, in which said straight-chained α-olefin is butene-1, pentene-1, hexene-1, heptene-1, octene-1, -nonene-1 or dodecene-1.

13. A process according to claim 1, in which the copolymerization is carried out in the presence of hydrogen.

* * * * *